W. R. MYERS.
ICE AND SALT DISPENSER.
APPLICATION FILED NOV. 2, 1921.

1,433,027.

Patented Oct. 24, 1922.
5 SHEETS—SHEET 1.

INVENTOR
Wilson R. Myers

BY
ATTORNEYS

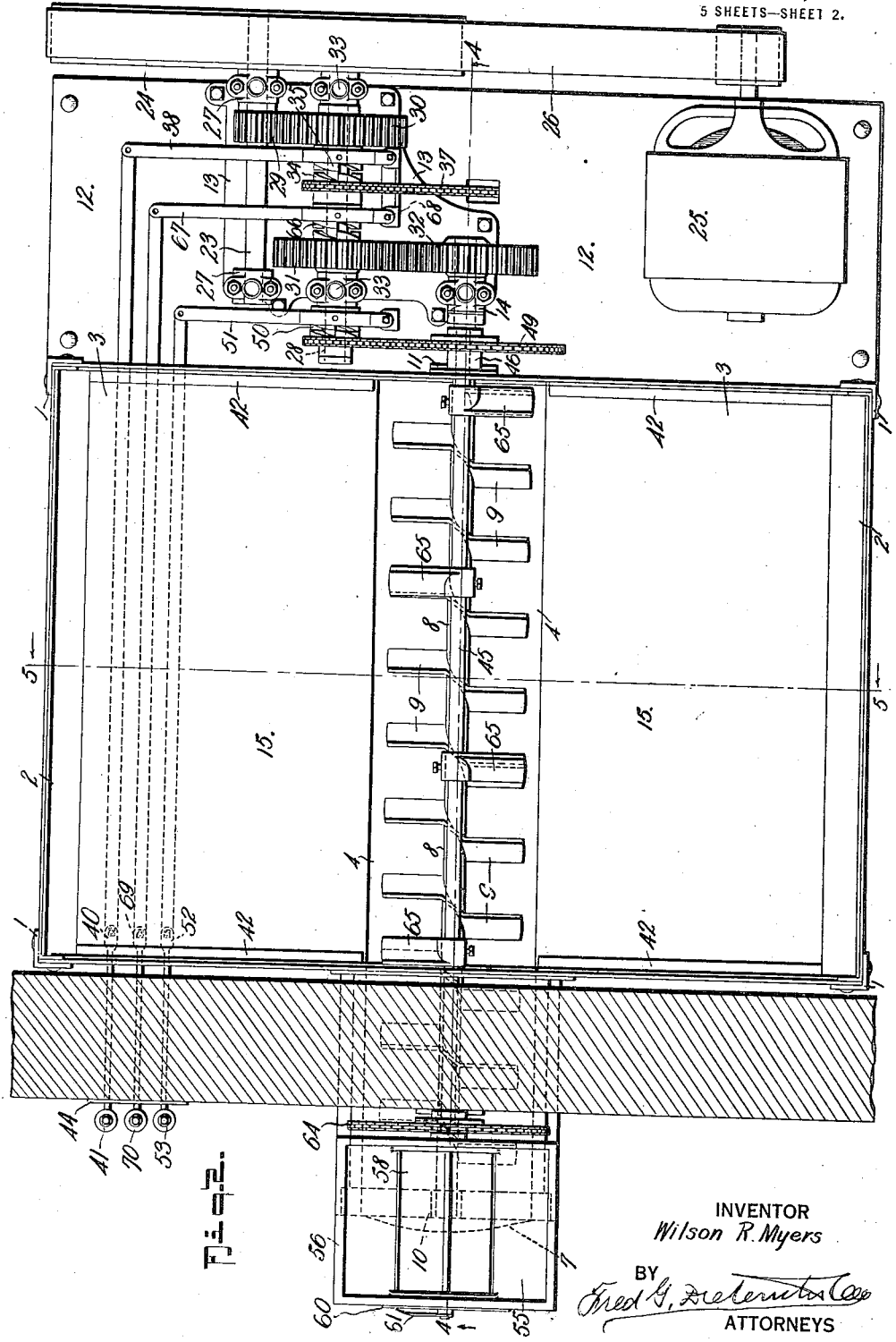

W. R. MYERS.
ICE AND SALT DISPENSER.
APPLICATION FILED NOV. 2, 1921.

1,433,027.

Patented Oct. 24, 1922.
5 SHEETS—SHEET 3.

INVENTOR
Wilson R. Myers

BY
Fred G. Dieterich Co.
ATTORNEYS

W. R. MYERS.
ICE AND SALT DISPENSER.
APPLICATION FILED NOV. 2, 1921.
1,433,027.
Patented Oct. 24, 1922.
5 SHEETS—SHEET 4.
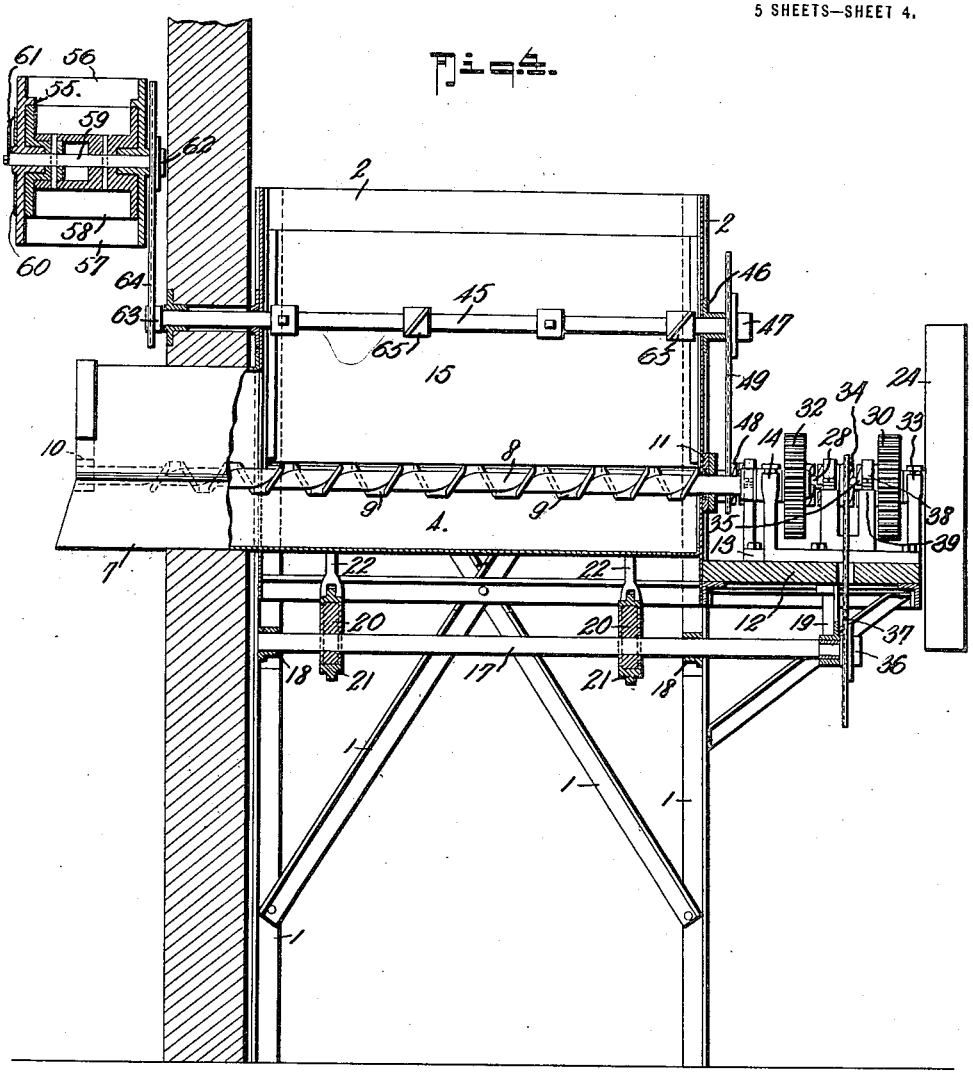
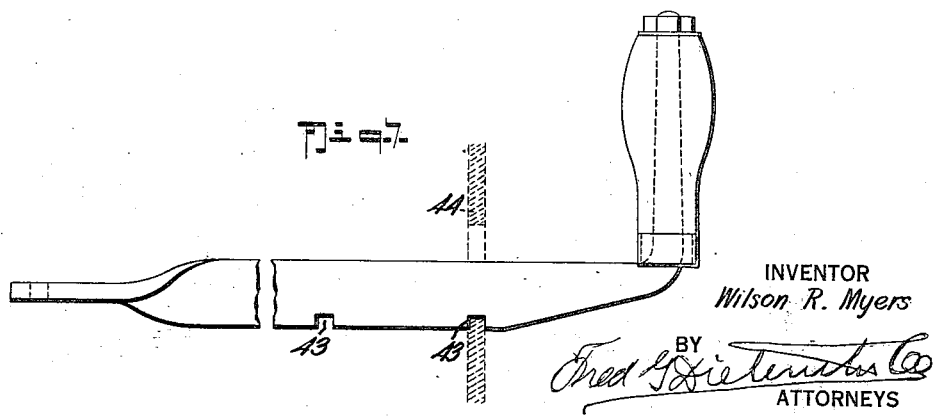
INVENTOR
Wilson R. Myers
BY
ATTORNEYS

W. R. MYERS.
ICE AND SALT DISPENSER.
APPLICATION FILED NOV. 2, 1921.

1,433,027.

Patented Oct. 24, 1922.
5 SHEETS—SHEET 5.

INVENTOR
Wilson R. Myers
BY
Fred G. Dieterich & Co.
ATTORNEYS

Patented Oct. 24, 1922.

1,433,027

UNITED STATES PATENT OFFICE.

WILSON R. MYERS, OF PORTLAND, OREGON, ASSIGNOR OF ONE-HALF TO GEORGE W. BURT, OF PORTLAND, OREGON.

ICE AND SALT DISPENSER.

Application filed November 2, 1921. Serial No. 512,333.

*To all whom it may concern:*

Be it known that I, WILSON R. MYERS, a citizen of the United States, residing at Portland, in the county of Multnomah and State of Oregon, have invented certain new and useful Improvements in Ice and Salt Dispensers, of which the following is a specification.

My invention relates to that art comprising machines for supplying crushed ice and salt to ice cream tubs and the present invention has for one of its objects to provide certain improvements in that type of machine which is disclosed in my applications filed April 24, 1920, Serial No. 376,185 and December 6, 1920, Serial No. 428,680, whereby the operation of the machine will be rendered more efficient and all danger of ice bridges interfering with the delivery of ice is eliminated. To this end the invention provides a hopper provided with a shaker-bottom for receiving the ice, a salt delivery mechanism which delivers the salt to the ice after it passes the discharge throat of the ice hopper instead of before as in the embodiment of my invention, Serial No. 376,185 aforesaid, and a more convenient control for the shaker, the ice delivery and salt delivery mechanisms.

The invention also has for its object to simplify and strengthen the construction of the machine as a whole and to reduce the cost of manufacture thereof.

The invention further resides in those novel features of construction, combination and arrangement of parts, all of which will be first fully described and then specifically pointed out in the appended claims, reference being had to the accompanying drawings in which:

Figure 2 is a top plan view of the same.

Figure 3 is a rear elevation of the machine.

Figure 4 is a vertical longitudinal section on substantially the line 4—4 of Figure 2.

Figure 7 is a detail of one of the clutch handles.

Figure 1:
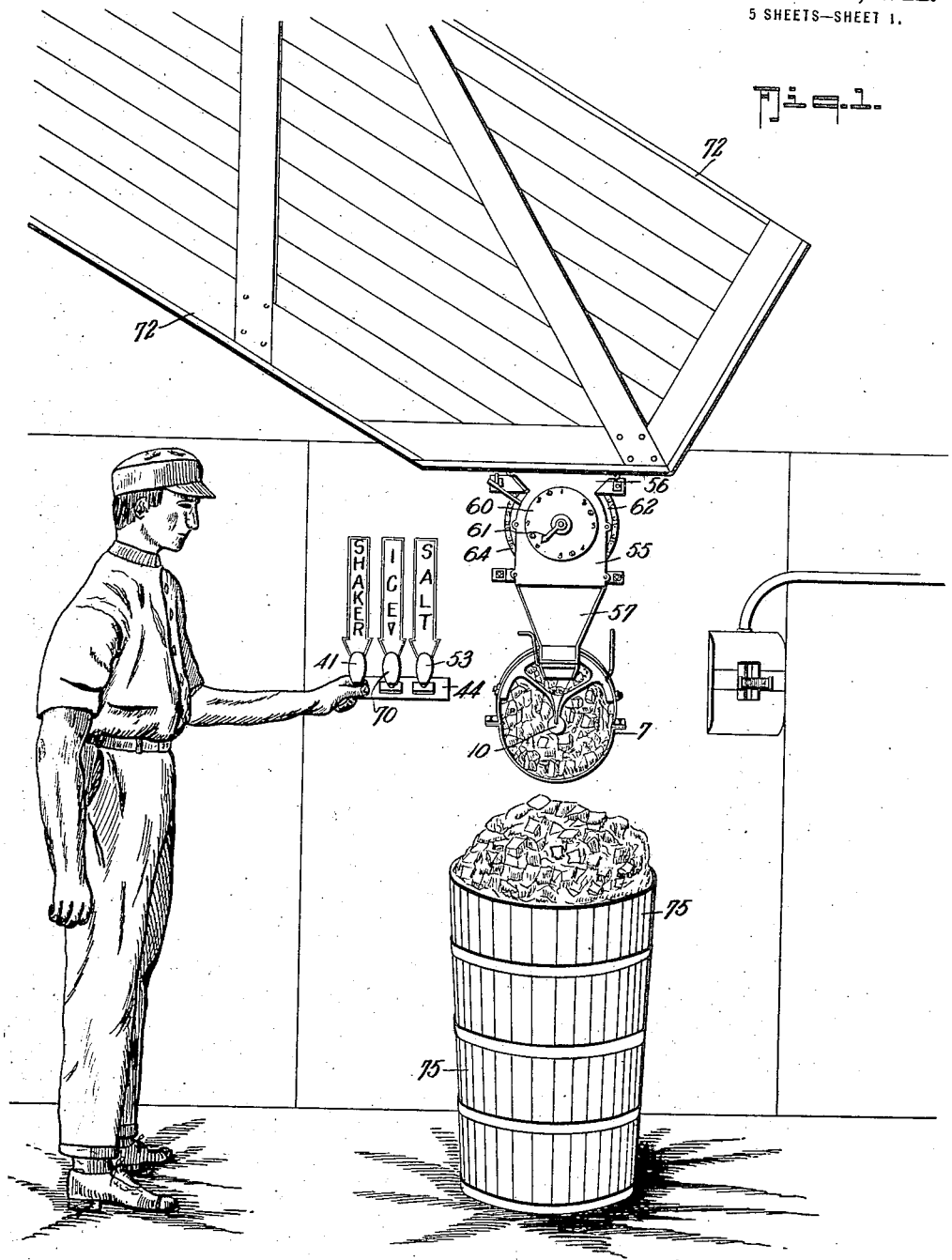
Figure 1 is a perspective view showing the invention in use.
Figure 5:
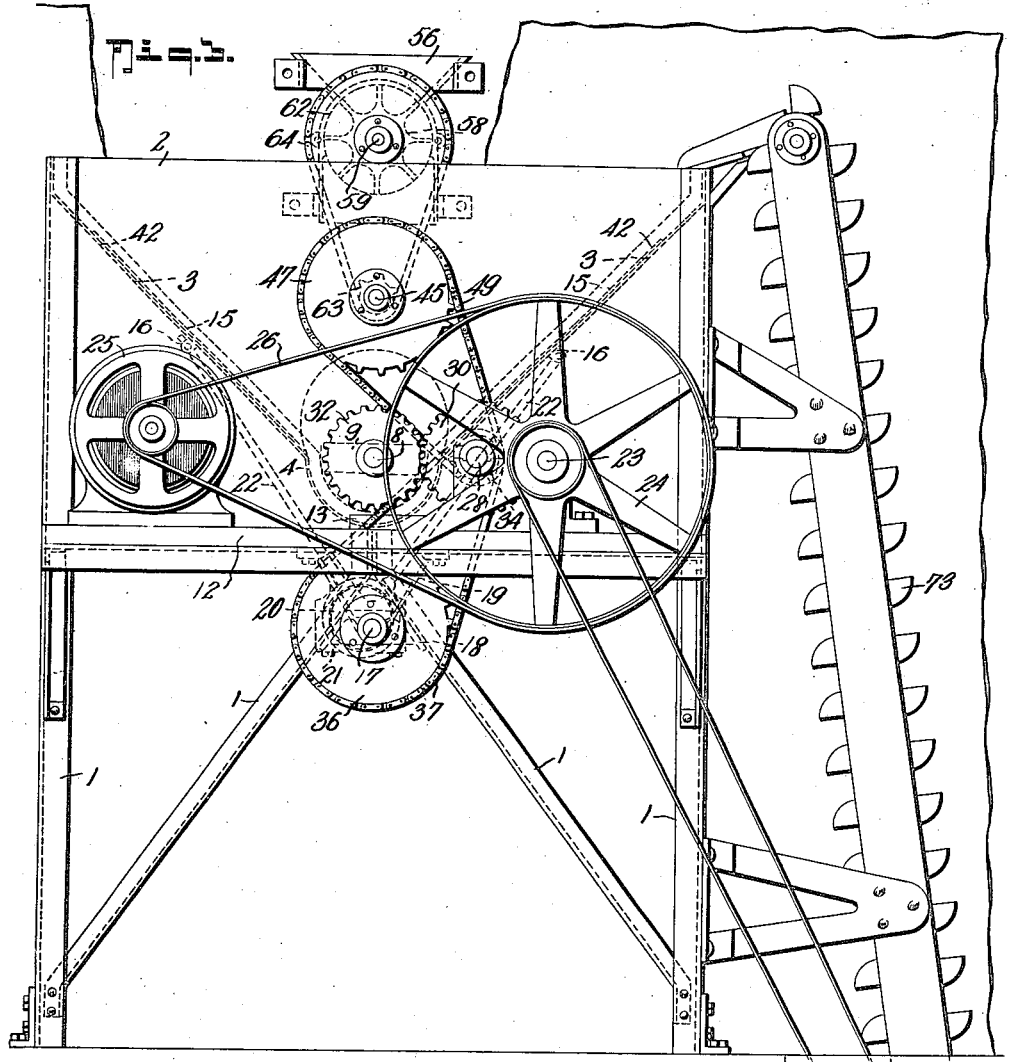
Figure 5 is a vertical cross section on substantially the line 5—5 of Figure 2.
Figure 6:
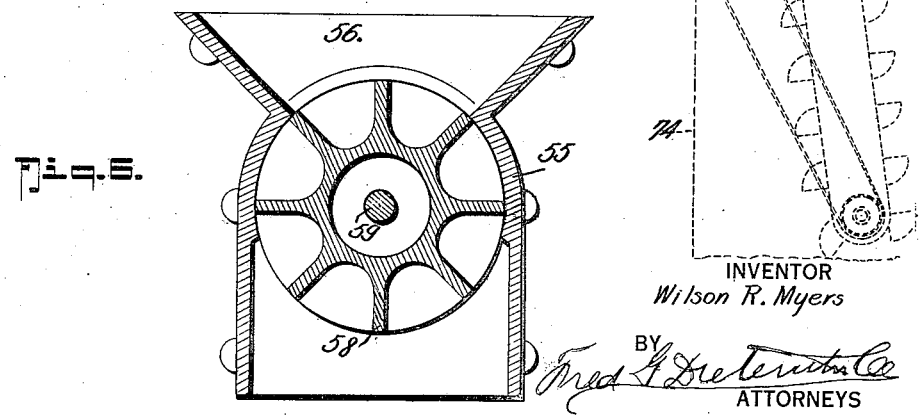
Figure 6 is a similar detailed cross section of the salt dispenser.
Figure 5:
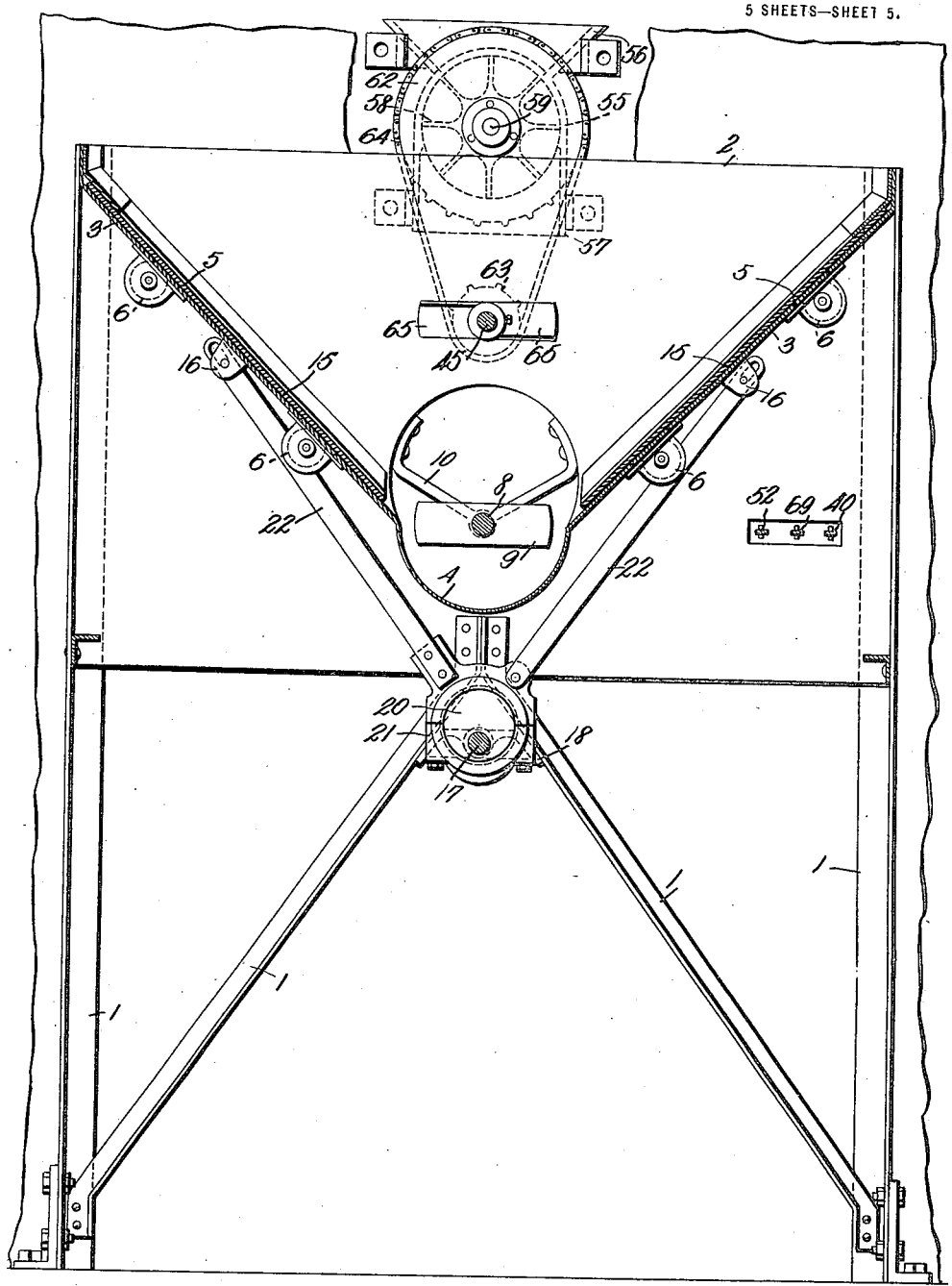

In the drawings in which like numerals and letters of reference designate like parts in all the Figures, 1 represents the supporting framework which is preferably of the skeleton angle iron type and which supports the ice hopper 2, the sloping sides 3 of which converge to the bottom concavity of cylindrical propeller-way 4. The sloping sides 3 of the hopper have slots 5 through which the shaker plates supporting the rollers 6 pass.

7 designates the throat or discharge-way from the hopper through which the ice is expelled by the action of the blades 9 of the feed propeller shaft 8. The shaft 8 is mounted in an end bearing 10, a thrust bearing 11 and a bearing 14, the latter being carried on the bearing frame 13 that is mounted on a platform 12 of the supporting framework. 15 designates the shaker plates having lugs 16 projecting through suitable slots in the sides 3 of the hopper. The shaker plates are adapted to move in their own planes and up and down along the sloping sided bottom in suitable guides 42, the operation being effected by a shaker shaft 17 and the connection between the same and the plates.

The shaker shaft 17 is journalled in an angle bearing 18 and a hanger bearing 19 and is provided with cams or eccentrics 20 over which take eccentric straps 21 which are joined by rods 22 with the lugs 16 of the shaker plates.

23 is the main power shaft which is journalled in suitable bearings 27 and which carries the pulley 24 that is driven by a belt 26 from a suitable motor 25. The main power shaft 23 drives the clutch shaft 28 through the medium of a pinion 29 keyed to the shaft 23 and meshing with a gear 30 keyed to the shaft 28.

31 is a clutch gear which runs loosely on the shaft 28 and meshes with the gear 32 on the propeller shaft 8. The shaft 28 is journalled in suitable bearings 33 and carries a sprocket-clutch member 34 which runs loosely on the shaft and is adapted to be connected therewith by a shifting clutch member 35. 36 is a sprocket on the shaft 17 which is connected by a chain 37 with the sprocket-clutch member 34. The clutch member 35 is moved into and out of engagement with the clutch member 34 through a medium of a clutch lever 38 which is fulcrumed at 39 and is operated by a shifting rod 40 that projects through the front plate 44 of the machine and has a handle 41 and is provided with holding notches 43 to cooperate with the front plate to hold the clutch engaged or disengaged.

45 is the salt measure drive shaft which is mounted in a bearing 46 and has a sprocket 47 which connects by a chain 49 to the sprocket-clutch member 48 that runs loosely on the shaft 28 with which it is adapted to be engaged by means of the shifting clutch member 50 which is operated through a lever 51 and a rod 52 having a handle 53 and holding notches in a manner similar to the operation of the shaker clutch mechanism.

The salt measure housing 55 is provided with a receiving hopper 56 and discharge spout 57 and is chambered to receive the measuring drum 58 on whose shaft 59 is an indicator pointer 61 that cooperates with the indicator plate 60 to inform the attendant of the amount of salt being dispensed. The salt measure drum shaft 59 has a sprocket 62 which is connected by a chain 64 with the drive sprocket 63 on the shaft 45. The shaft 45 is also preferably run through the ice hopper and is provided with blades 65 to act as an agitator to break up ice bridges should the same form in the hopper. 66 is the clutch which controls the action of the ice propeller. This clutch is operated by a lever 67 fulcrumed at 68 and operated by a shifting rod 69 that is provided with a handle 70 and with holding notches to cooperate with the front plate of the machine.

In the practical embodiment of my invention at present in use, the salt is delivered to the hopper 56 from the salt bin by means of a chute 72, while the ice is delivered to the hopper 2 by a bucket conveyer or ice elevator 73 from a pit 74 in which the ice is crushed.

It will be observed that the shaft 8 with the blades 9 not only runs the full length of the ice hopper but is also extended into the discharge throat 7 so as to force the ice or propel it from the hopper along the concavity of the recess or channel (trough) in its bottom and through the discharge throat where it falls by gravity into the tub 75 beneath the discharge throat.

It will also be observed that the discharge spout 57 of the salt measure delivers the salt onto the ice which has been or is being deposited into the tub 75, and by providing the separate controls for the shaker, the ice feed and the salt measure, the operator may regulate the several parts independently so that they may operate independently of one another or simultaneously at the will of the attendant.

As shown in Figure 1 the tub is placed in position and the operator manipulates the "ice" handle 70 to throw in the clutch and start the ice propeller into operation. He then usually operates the "salt" handle 53 to set the salt dispenser into operation to dispense such quantity of salt into the tub on the ice as may be desired.

Should the flow of ice through the discharge throat fall off thus indicating the formation of ice bridges in the hopper the attendant manipulates the handle 41 to set the shaker plates into operation, the action of which will cause the ice bridges to be broken and this action of the shaker plates is assisted by agitator blades 65 on the shaft 45 as the salt dispenser operates.

The ice hopper, of course, can be filled with ice in any suitable way when the invention is used in connection with large ice cream plants. It is also preferable to have the feed of ice to the hopper continuous and this can be done by means of the ice elevator 73 which elevates the ice from the crushing pit 74. Likewise a continuous supply of salt to the salt hopper 56 may be had by passing through the chute 72 from the salt bin (not shown) to the salt hopper.

The practical use of my invention has demonstrated that by means of the same the filling of ice cream tubs with ice and salt can be accomplished with great facility and with a minimum amount of mess as very little ice and salt is spilled during the proper manipulation of the machine for its intended purposes.

Any means may be provided for moving the tubs into and out of place, as for example, the runner conveyer as indicated in my former applications or the tubs may be moved in and out of position by the attendant if desired.

I have found from practical experience that by making the ice propeller in the nature of an open propeller and by extending it into the discharge throat all possibility of the ice jambing by reason of partly freezing or becoming lodged in the hopper will be avoided and the danger of the ice becoming frozen to the propeller itself is likewise overcome so that with the use of my present invention the formation of ice bridges within the ice hopper and the discharge throat is almost entirely, if not entirely, eliminated.

From the foregoing description, taken in connection with the accompanying drawings, it is thought that the construction, operation and advantages of the invention will be clear to those skilled in the art to which it relates.

What I claim is:

1. In apparatus of the class described, a supporting framework, an ice receiving hopper having downwardly converging bottom walls, shaker plates constituting a false bottom in said hopper and supported on said bottom walls and means for reciprocating said plates.

2. In an apparatus of the class described, a supporting framework, an ice receiving hopper having downwardly converging bottom walls and a trough at the bottom of said walls to which the material passes, shaker plates lying over said bottom walls substantially parallel with the same, guide rollers carried by said bottom walls for supporting said plates and means for reciprocating said plates back and forth in planes substantially parallel with the converging walls of the hopper bottom.

3. In apparatus of the class described, a supporting framework, an ice receiving hopper having downwardly converging bottom walls and a trough at the bottom of said walls, said hopper having an outlet from said trough, means for forcing the material along said trough to the outlet, shaker plates, means mounted on said converging bottom walls for sustaining said shaker plates and means for reciprocating said plates.

4. In apparatus of the class described, a supporting framework, an ice receiving hopper having downwardly converging bottom walls and a trough at the bottom of said walls, said hopper having an outlet from said trough, means for forcing the material along said trough to the outlet, shaker plates, means mounted on said converging bottom walls for sustaining said shaker plates and means for reciprocating said plates, said means comprising cam and pitman rods mounted external of the hopper, said bottom walls having slots and said plates having lugs projecting through said slots to which said pitman rods connect.

5. In an apparatus of the class described, a supporting framework, an ice receiving hopper on the framework having downwardly converging bottom walls, a trough at the bottom of said walls discharging to the front of the apparatus, a feed propeller shaft in said trough, a salt dispensing device mounted at the front of said framework, a shelf mounted on said framework at the rear of the apparatus, shaker plates mounted on said converging bottom walls, a rotary agitator in said hopper, means for operating said shaker plates, said agitator, said propeller shaft and said salt dispensing device, said means including power transmitting elements and clutch connections mounted on said shelf with operating levers for the same, and operating rods connected to said levers and extended to the front of the apparatus for manual control thereof.

6. In apparatus of the class described, a supporting framework having a shelf, an ice receiving hopper on the framework, a bearing frame on the shelf, said hopper having downwardly converging bottom walls, a trough at the bottom of said walls, a feed propeller shaft in said trough, said hopper having a discharge passage leading from the trough, shaker plates on the hopper bottom walls, a main power shaft journalled in bearings on said bearing frame, a counter shaft geared with said main power shaft and also journalled in bearings in said bearing frame, clutch and gear connections between said counter shaft and said propeller shaft, means including clutch and gear connections with said counter shaft for operating said shaker plates, a salt dispenser having a spout to deliver salt to the ice issuing from said discharge passage of said ice hopper, power transmitting connections between said counter shaft and said salt dispenser and including clutch members, independent clutch shifting levers for the several clutch members that control the propeller shaft, the shaker plates, and the salt dispenser, and independent handle rods connecting with the respective levers and arranged with their handles in proximity whereby to bring the control of the machine under the influence of one operator.

7. In apparatus of the class described, a supporting framework having a shelf, an ice receiving hopper on the framework, a bearing frame on the shelf, said hopper having downwardly converging bottom walls, a trough at the bottom of said walls, a feed propeller shaft in said trough, said hopper having a discharge passage leading from the trough, shaker plates on the hopper bottom walls, a main power shaft journalled in bearings on said bearing frame, a counter shaft geared with said main power shaft and also journalled in bearings in said bearing frame, clutch and gear connections between said counter shaft and said propeller shaft, means including clutch and gear connections with said counter shaft for operating said shaker plates, a salt dispenser having a spout to deliver salt to the ice issuing from said discharge passage of said ice hopper, power transmitting connections between said counter shaft and said salt dispenser and including clutch members, independent clutch shifting levers for the several clutch members that control the propeller shaft, the shaker plates, and the salt dispenser, and independent handle rods connecting with the respective levers and arranged with their handles in proximity whereby to bring the control of the machine under the influence of one operator, said salt dispenser power transmitting connection including a shaft projected through said ice hopper and having agitating blades.

WILSON R. MYERS